May 1, 1923.
E. C. CONRADE
HEDGE CLIPPER OR TRIMMER
Filed Feb. 14, 1922
1,453,621
10 Sheets-Sheet 2
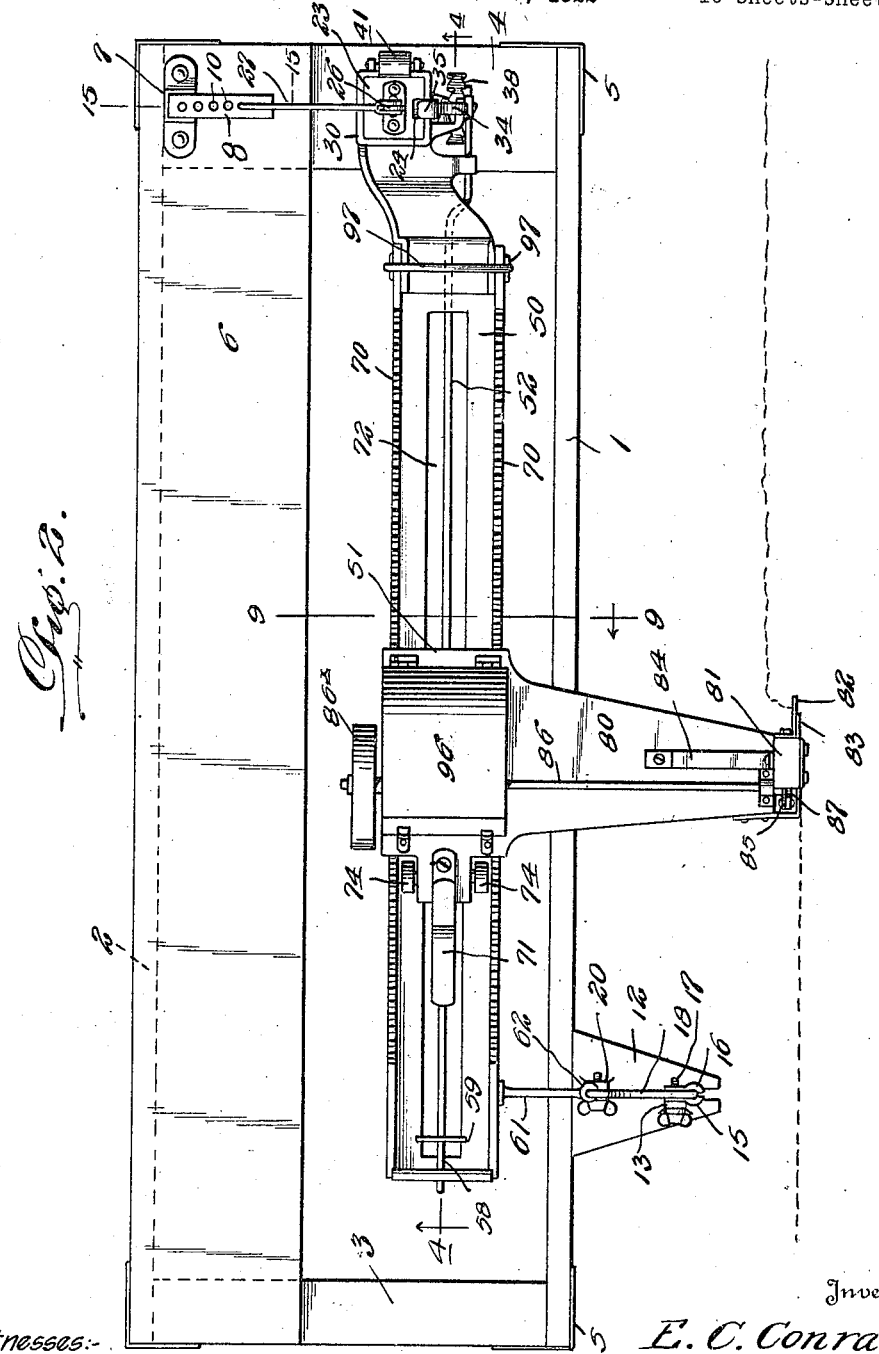
Witnesses:-
Hyman Berman
Lawrence Schlosser
Inventor
E. C. Conrade,
By Clarence Abb Inan
Attorney

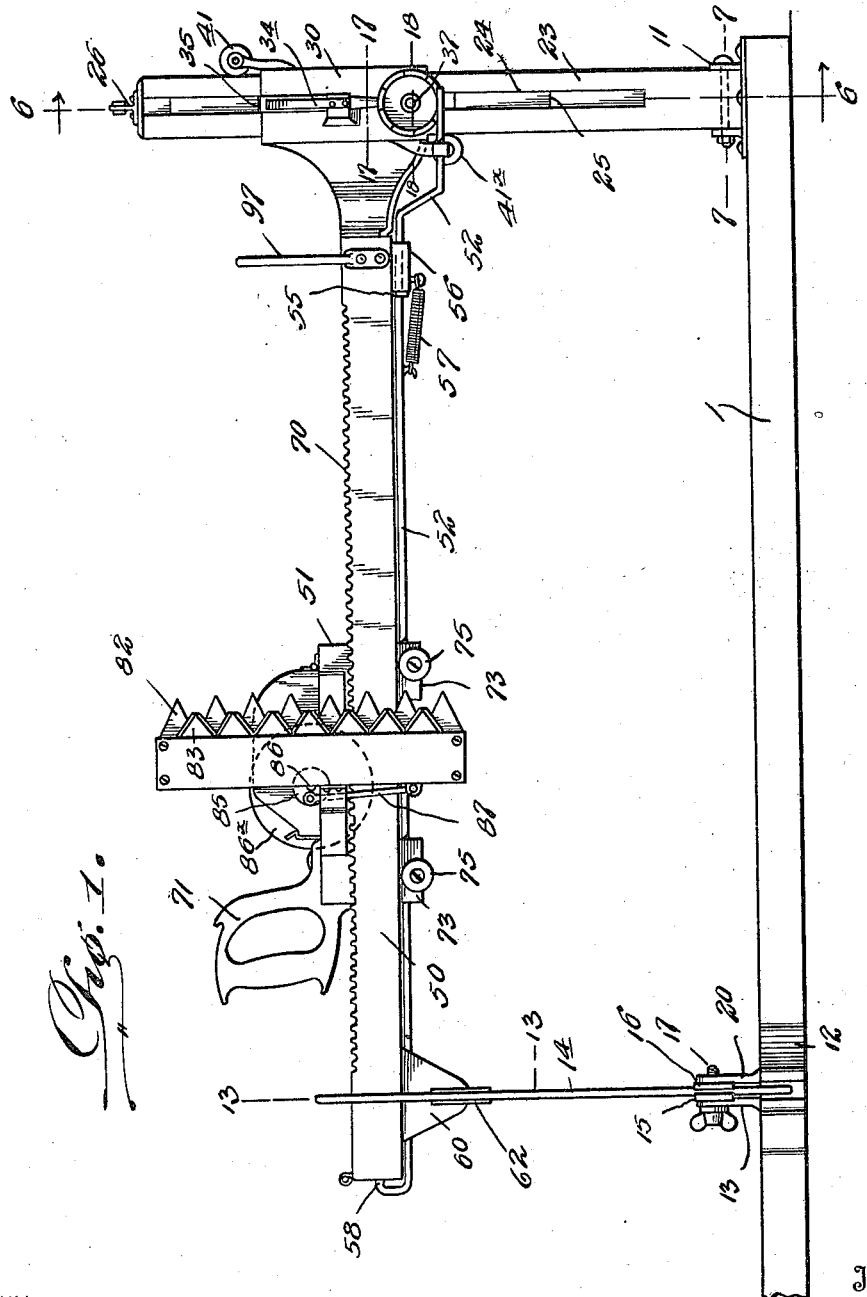

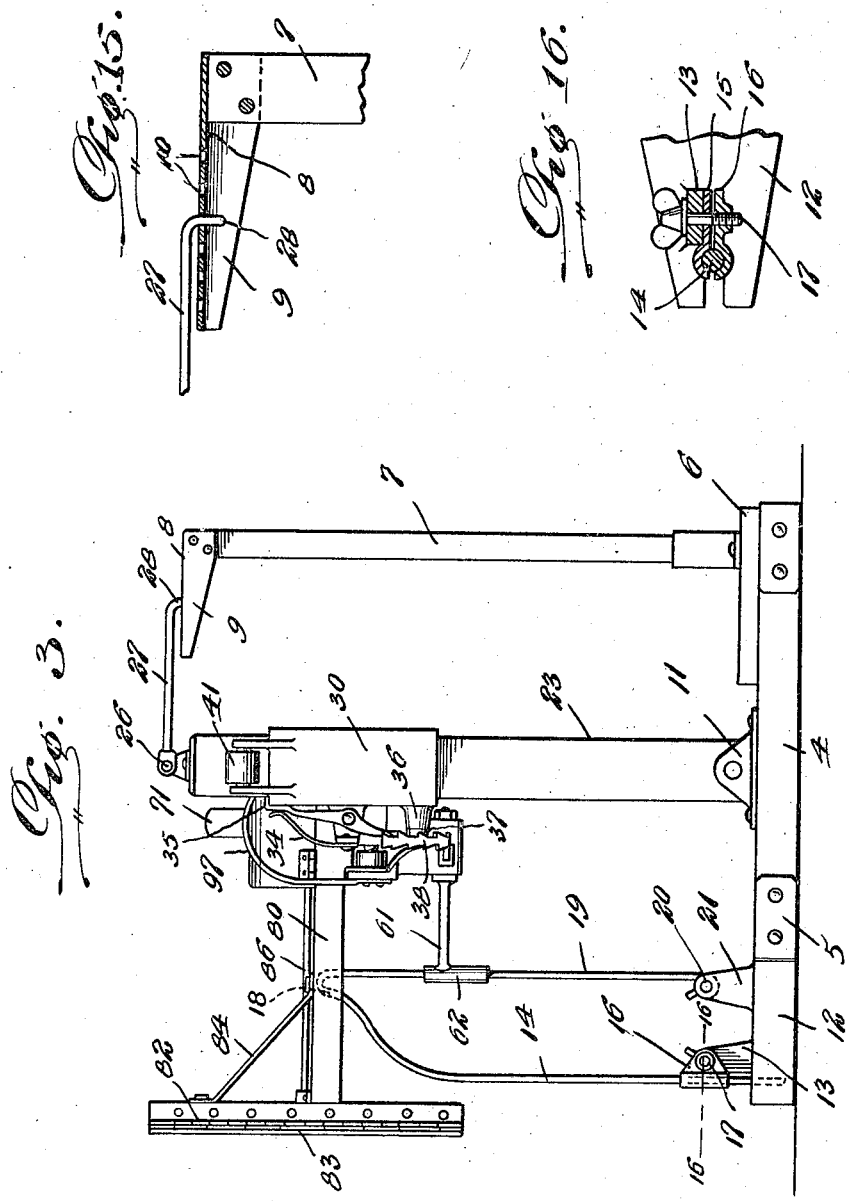

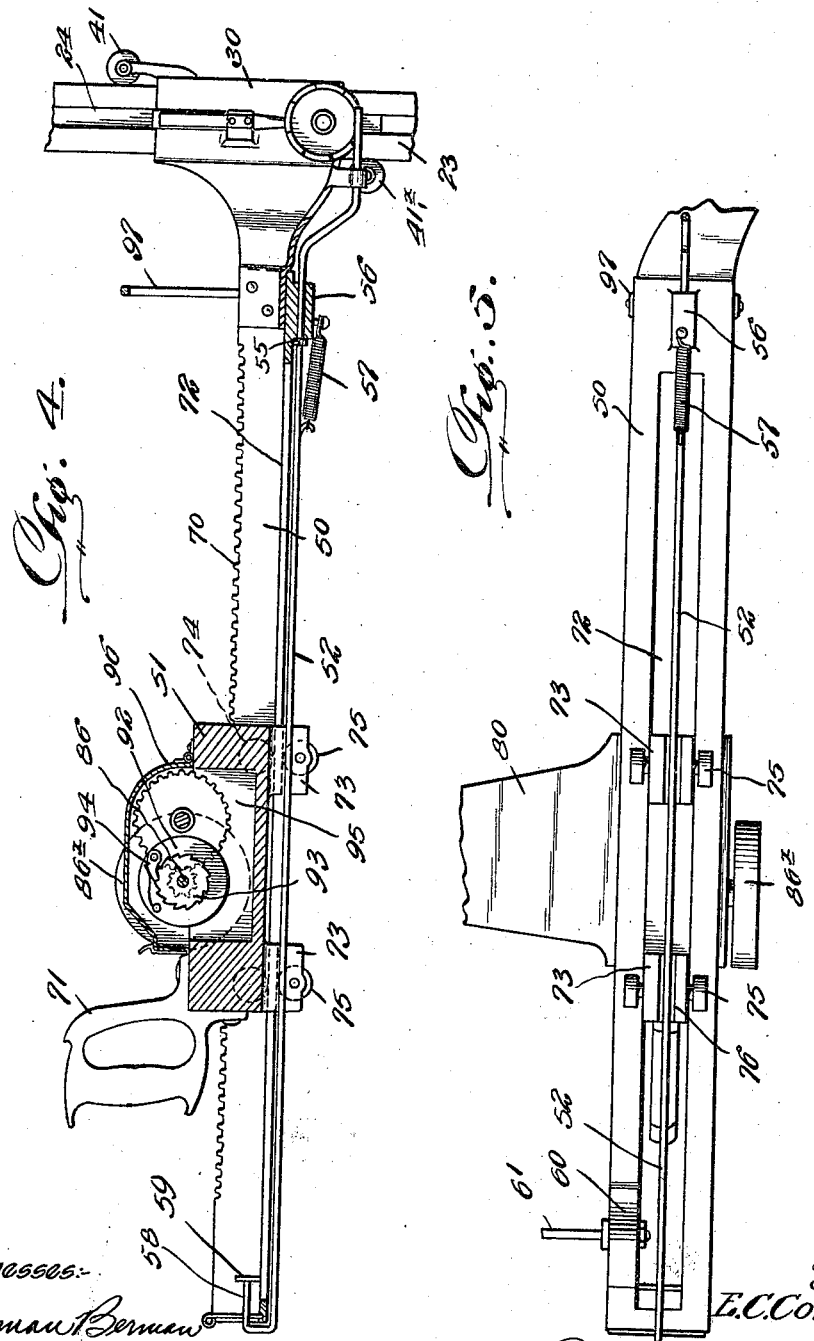

May 1, 1923.
E. C. CONRADE
HEDGE CLIPPER OR TRIMMER
Filed Feb. 14, 1922
1,453,621
10 Sheets-Sheet 5
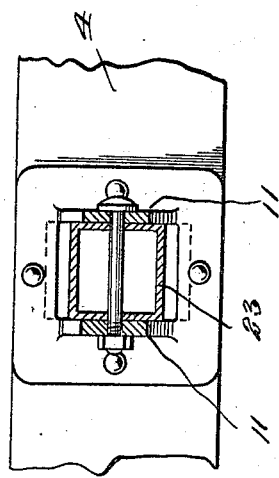
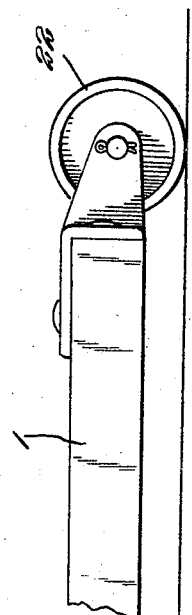
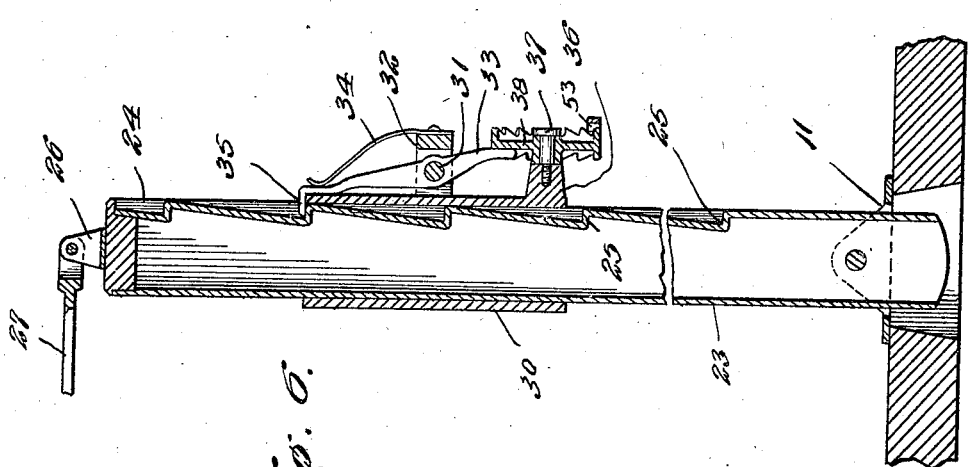
Witnesses:-
Hyman Berman
Lawrence Schlosser
Inventor
E. C. Conrade,
By Clarence A O'Brien
Attorney

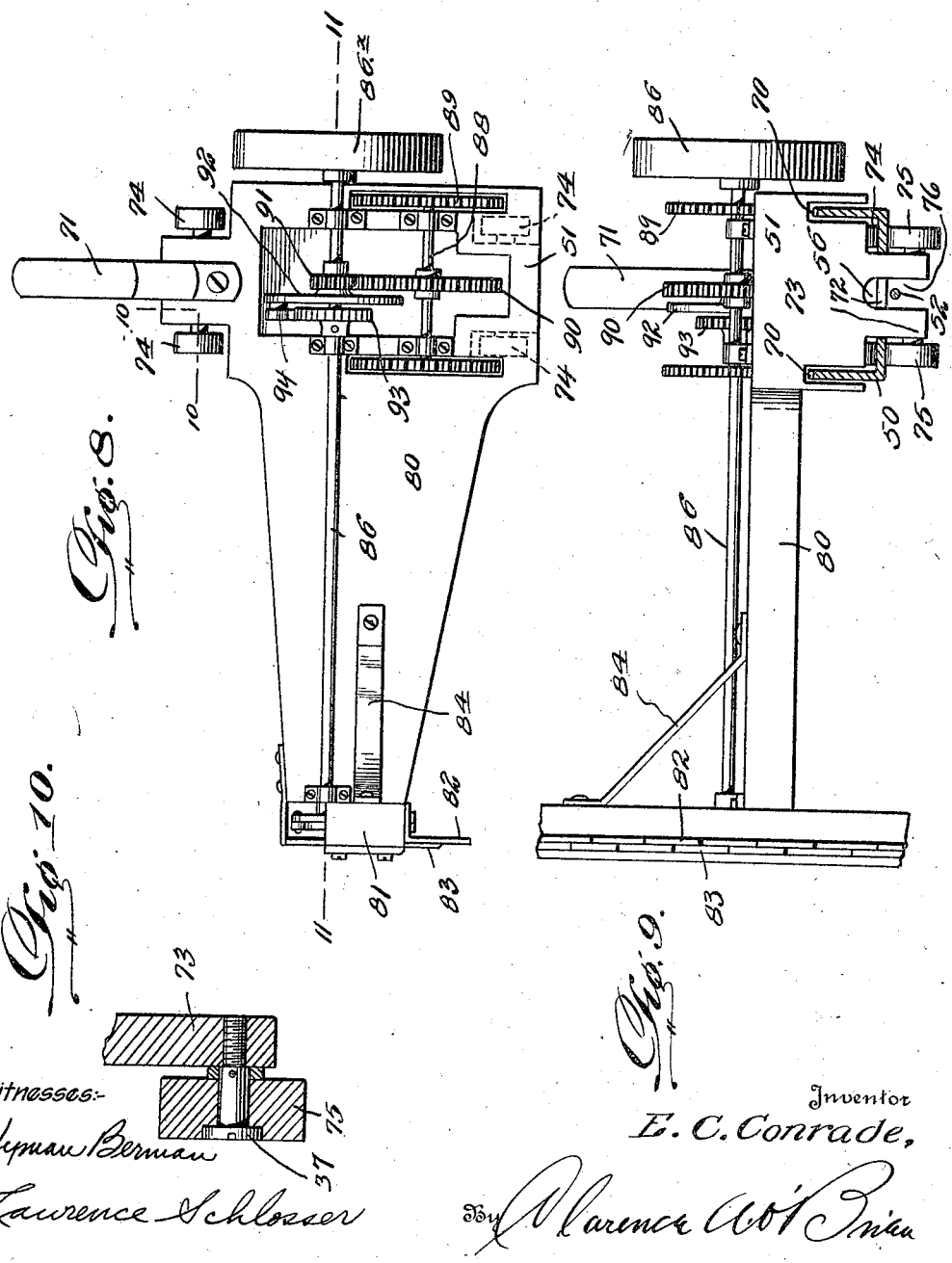

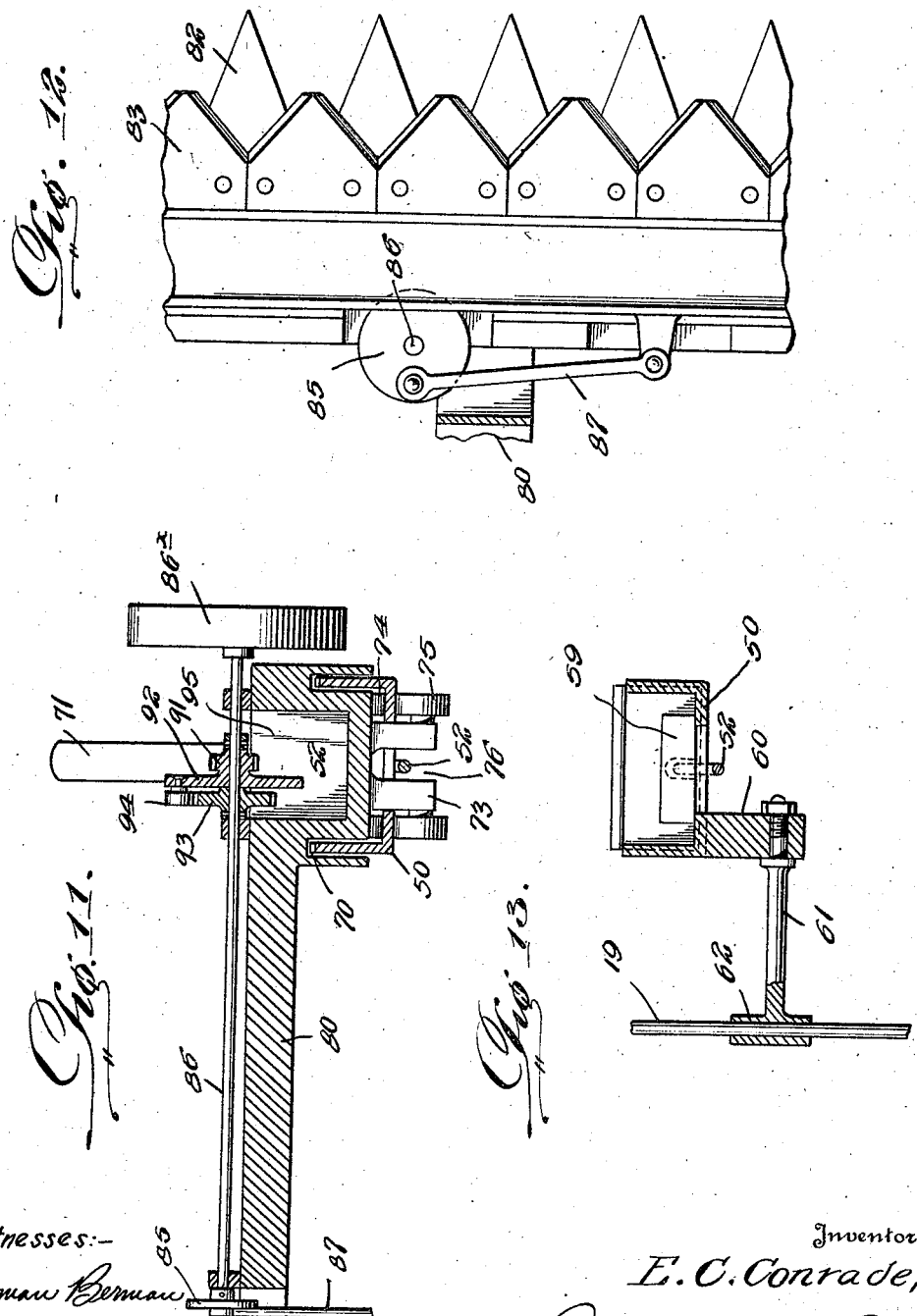

May 1, 1923.
E. C. CONRADE
1,453,621
HEDGE CLIPPER OR TRIMMER
Filed Feb. 14, 1922
10 Sheets-Sheet 8
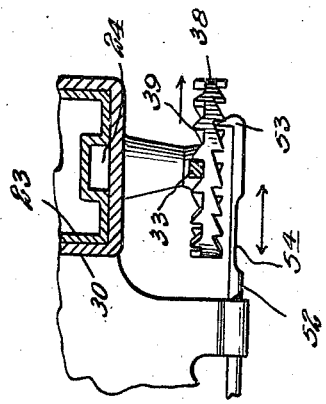
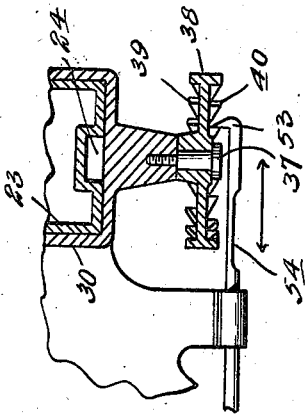
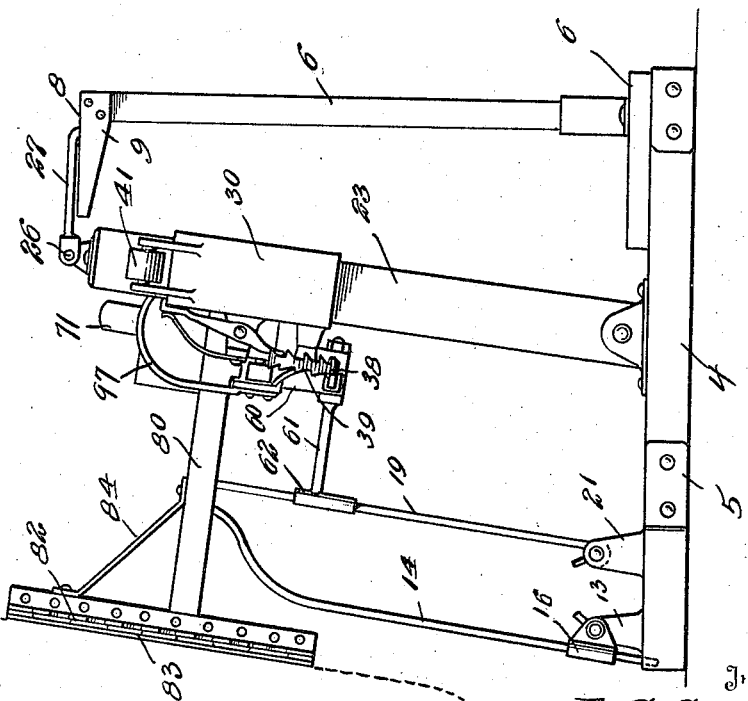

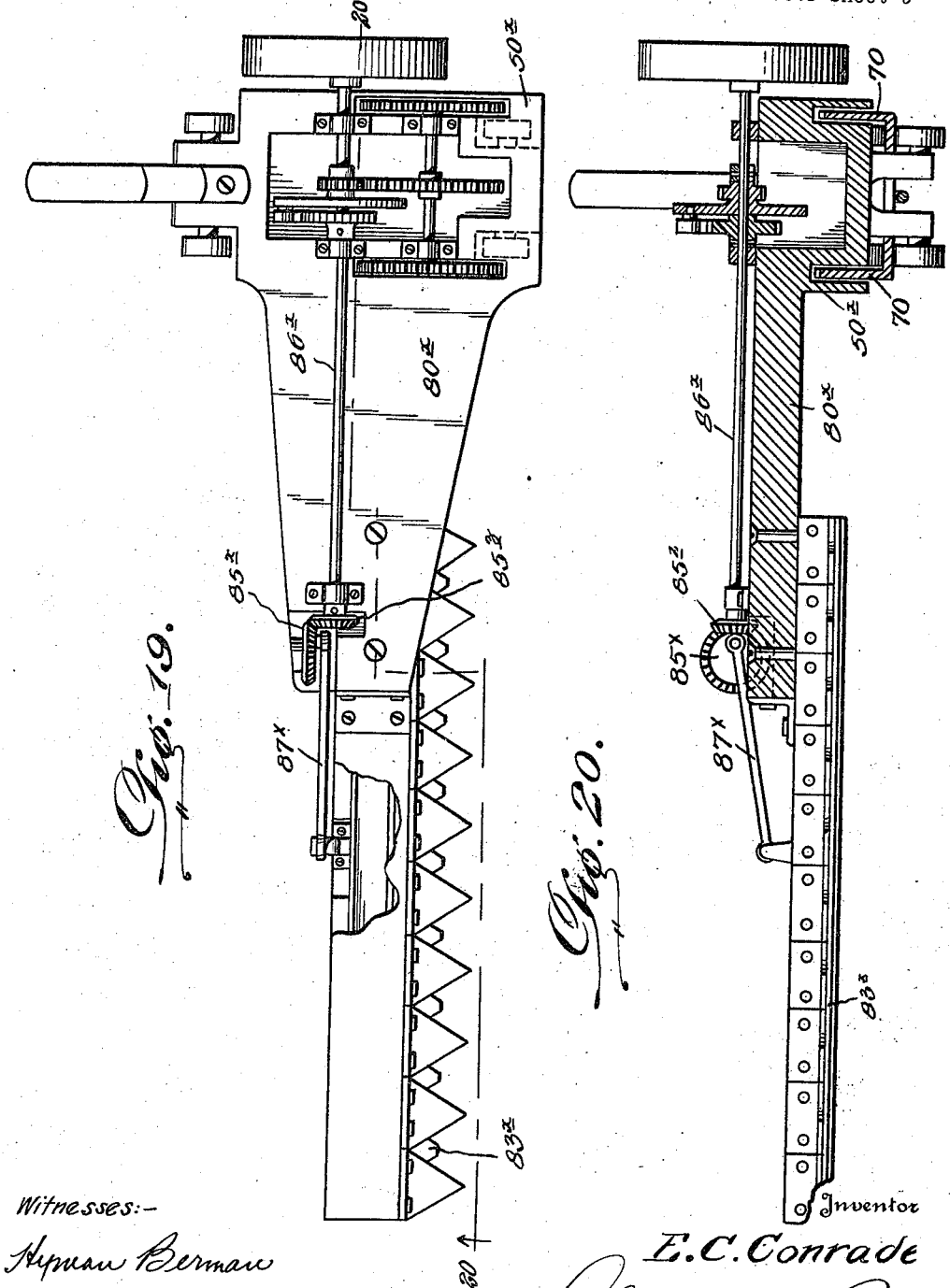

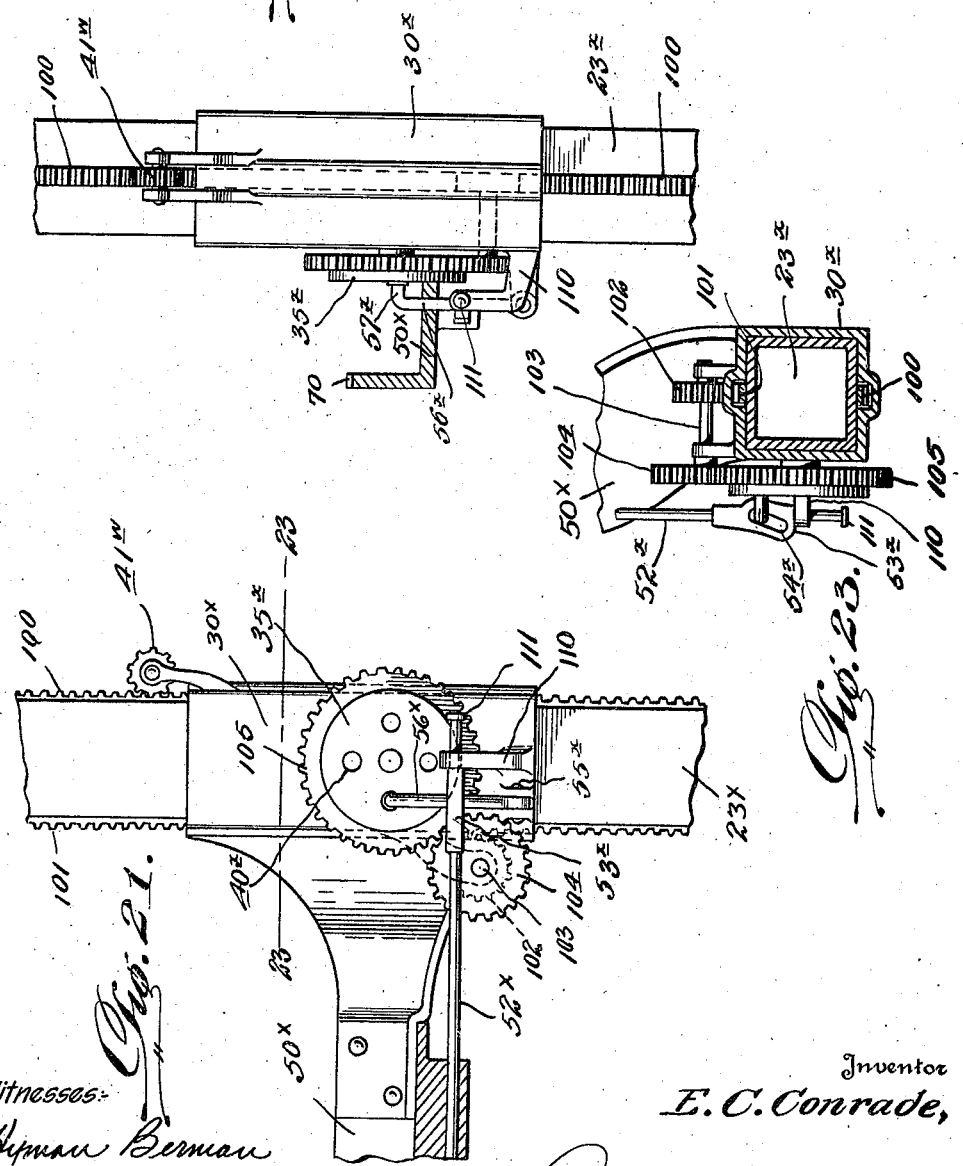

Patented May 1, 1923.

1,453,621

UNITED STATES PATENT OFFICE.

EVERETTE C. CONRADE, OF LEWISVILLE, NORTH CAROLINA.

HEDGE CLIPPER OR TRIMMER.

Application filed February 14, 1922. Serial No. 536,426.

*To all whom it may concern:*

Be it known that I, EVERETTE C. CONRADE, a citizen of the United States, residing at Lewisville, in the county of Forsyth and State of North Carolina, have invented new and useful Improvements in Hedge Clippers or Trimmers, of which the following is a specification.

The object of my said invention is the provision of a portable and manually-operable organized mechanism through the medium of which a hedge can be expeditiously and efficiently clipped or trimmed in a finished manner.

To the attainment of the foregoing, the invention consists in the improvement as hereinafter described and definitely claimed.

In the accompanying drawings, forming part of this specification:—

Figure 1 is a side elevation showing my novel apparatus as actually reduced to practice and successfully operated.

Figure 2 is a plan view of the same.

Figure 3 is an end elevation of the apparatus.

Figure 4 is a vertical longitudinal section taken in the plane indicated by the line 4—4 of Figure 2.

Figure 5 is an inverted plan view of a portion of the apparatus and hereinafter explicitly referred to.

Figure 6 is a detail vertical transverse section on the line 6—6 of Figure 1.

Figure 7 is a detail horizontal section on line 7—7 of Figure 1.

Figure 8 is an enlarged top plan of the carriage, with the cover removed.

Figure 9 is a detail section on line 9—9 of Figure 2.

Figure 10 is a detail section on line 10—10 of Figure 8.

Figure 11 is a section on line 11—11 of Figure 8.

Figure 12 is an enlarged detail fragmentary elevation of the cutting mechanism.

Figure 13 is a detail section on line 13—13 of Figure 1.

Figure 14 is an end elevation with the cutting mechanism positioned at an angle from the vertical.

Figure 15 is a detail section on line 15—15 of Figure 2.

Figure 16 is a detail section on line 16—16 of Figure 3.

Figures 17 and 18 are detail sections on the lines 17—17 and 18—18, respectively, of Figure 1.

Figure 19 is a top view, partly broken away, showing a modification for hedge-top trimming.

Figure 20 is a section on line 20—20 of Figure 19.

Figures 21, 22 and 23 are detail views illustrative of another modification, Figures 21 and 22, being taken at right angles to each other, and Figure 23 being taken on the line 23—23 of Figure 21.

Figure 24 is an enlarged detail of another modification.

Similar numerals designate corresponding parts in Figures 1 to 18.

By comparison of Figures 1, 2, 3 and 14 the illustrated base of the trimmer which is adapted to be slidably moved on the ground will be understood as comprising longitudinal bars 1 and 2 in parallelism, transverse end bars 3 and 4 interposed between and fixed to the bars 1 and 2, the connections being reenforced by corner irons 5, and a longitudinal platform 6 superimposed on and fixed to the end bars 3 and 4. It is intended for the operator to stand on the said platform 6 while actuating the trimmer.

Fixed to the said platform 6, adjacent to one end of the base is an upright 7, at the upper end of which is a lateral inwardly-directed arm 8, provided with pendent flanges 9, and vertical apertures 10, Figure 15.

At 11 on the base bar 4 are fixed standards, Figures 3, 6 and 7, and at 12 on the base bar 1 is a fixed lateral projection on which is a standard 13, Figures 1, 3 and 16. Adjustably fixed relative to the standard 13 is a forward rod 14, the adjustable fixture being effected by clamping members 15 and 16 and a headed screw 17. The said forward rod 14 has its upper end connected through a bight 18, Figure 3, with a rear rod 19, Figures 3 and 14, pivotally connected and adjustably fixed at 20 to a rear standard 21 on the projection 12.

When deemed expedient the base of the apparatus may be provided at its four corners with ground wheels designed to facilitate movement of the apparatus, one of the said wheels being shown in Figure 24 and designated by 22.

Pivotally connected between the standards 11 on the base is a column 23, capable of being swung in the direction of the width of the trimmer, Figures 3 and 14. The said column 23 is hollow and of rectangular form in horizontal section. In its front wall is a vertical channel 24, Figures 1, 4, 6, 17 and 18, the inner wall of the said channel being provided with steps or vertically spaced supports 25. On the upper end of the column 23 is a standard 26 to which is pivotally connected a rod 27 with a pendent free end 28 adapted to be socketed in one of the apertures 10 of the arm 8. Because of the said provision the column may be secured in vertical position for the trimming of a vertical hedge-side or may be adjustably fixed at various angles of inclination for the trimming of inclined hedge sides.

By particular reference to Figures 1, 2, 3, 6, 17 and 18 it will be understood that a sleeve 30 corresponding in cross-section to and snugly fitting the column 23 is adjustable up and down thereon. Fulcrumed at 31 on a bracket 32 is a lever 33, backed by a spring 34 and having an angularly-disposed upper end portion 35 to engage the steps or supports 25 and thereby maintain the sleeve 30 at various heights. Also carried by the sleeve 30 is a lateral projection 36 on which is a journal 37 for a wheel 38, Figures 6, 17 and 18, with beveled teeth 39 at its inner or rear side and similar teeth 40 at its outer or forward side. Manifestly when the wheel 38 is turned through a part of a revolution in the direction indicated by the arrow in Figure 17, one of the teeth 39 thereof operating against the lower arm of the lever 33 will disengage the upper portion 35 of the lever from one step 25 of the column 23 and permit the sleeve 30 to gravitationally move downwardly until the lever portion 35 brings up against and rests on the next lower step 25 of the column 23. In this way the cutting mechanism is located step by step downwardly to operate on a hedge from the top to the bottom or lower portion thereof. To ease the vertical movements on the column 23, said sleeve carries anti-friction rollers 41 and 41× which bear against opposite sides of said column 23 at points above and below the sleeve 30, respectively. It will also be noticed that the said rollers 41 and 41× bear against the opposite sides of the column 23, at points above and below the sleeve 30, with a view to assisting in preventing sagging of said longitudinal support.

The longitudinal carriage-support alluded to is designated by 50, and the carriage movable rectilinearly on the said support 50 is designated by 51. Movable in a longitudinal direction under the support 50 and in appropriate guides carried by said support is a rod 52 with a lateral beveled toe 53 at one end, opposed to the teeth 40 of the wheel 38. It will also be noticed that the rod 52 is provided adjacent to the toe 53 with a reduced and resilient portion 54 to enable the toe end of the rod to flex laterally. At 55, Figure 1, the rod 52 is provided with a stop to bring up against the guide 56 on the support 50 so as to limit the movement of the toe 53 outwardly beyond the position shown in Figure 17, and as a means for retaining the rod in a position in which the toe would engage the successive steps 40 of the wheel 38 there is provided a retractile spring 57, Figures 1, 4 and 5, interposed between and connected to the guide 56 and the rod 52. The rear end of the rod 52 is bent upwardly and forwardly, as designated by 58 in Figure 4, and is provided with a head 59. Therefore when the operator desires to lower the sleeve 30, the support 50 and the carriage 51, it is simply necessary for him to move the carriage 51 toward the left in Figures 2 and 4 sufficiently far for the carriage to retract the rod 52 against the action of the spring 57. Then as the carriage 51 is moved toward the right the contraction of spring 57 will move the rod 52 toward the right and restore the toe 53 to normal position. The movement of rod 52 by the carriage 51 will turn wheel 38 and disengage the lever portion 35 from a step 25 of the column 23 and permit of the described gravitation of the sleeve 30, support 50 and carriage 51.

At 60 on the support 50, Figures 1 and 13, is a pendent lug, and fixed to said lug 60 is a lateral rod 61 having a sleeve 62 which loosely receives the rod portion 19, whereby said rod portion is enabled to assist in holding the support 50 against casual movement.

On the support 50 are longitudinal rack bars 70, and on the carriage 51 is a handle 71 through the medium of which the carriage can be conveniently reciprocated by the operator. It will also be understood by comparison of Figures 2, 4, 8 and 9 that the support 50 is provided with a longitudinal slot 72, and that the carriage 51 is provided with pendent guide portions 73 in said slot, and with anti-friction wheels 74 and 75 to bear against the upper side and lower side, respectively, of the slotted wall of the support. At 76 said guide portions 73 are grooved, Figure 5, so as to avert interference between the guide portions and the rod 52.

As best shown in Figures 2, 8 and 9 the carriage 51 is provided with a lateral extension 80 on the end of which is an upright 81, equipped with a finger bar 82 included in a cutting mechanism which also comprises a reciprocatory sickle 83. Said upright 81 is braced at 84.

For the reciprocation of the sickle 83 on movement of the carriage toward the right in Figure 1, I provide the driving connection best shown in Figures 1, 2, 4, 8 and 9 which connection comprises a crank disk 85 on a transverse shaft 86 which also carries a balance wheel 86$^x$, a pitman 87 between said disk and the sickle 83, a shaft 88, spur gears 89 fixed on said shaft and meshed with the racks 70, a spur gear 90 fixed on the shaft 88, a gear 91 loose on the shaft 86 and meshed with the gear 90, a disk 92 also loose on the shaft 86 but fixed to the gear 91, a ratchet 93 fixed on the shaft 86, and a spring-pressed pawl 94 carried by the disk 92 and arranged through cooperation with the ratchet 93 to reciprocate the sickle 83 incident to movement of the carriage 51 toward the right in Figure 1. Manifestly on movement of the carriage 51 toward the left in Figure 1 the pawl 94 will idle over the ratchet 93 and hence the sickle 83 will not be moved relative to the finger bar 82. For the sake of compactness the gearing described is arranged partially in a chamber 95 in the upper side of the carriage 51, a hinged cover 96 being normally arranged over the said gearing, as illustrated.

At 97 the carriage support 50 is provided with a handle, preferably bail-shaped as illustrated, and designed to enable an operative to readily lift the carriage support 50.

It will be apparent from the foregoing that through the medium of my novel apparatus, an operator is enabled to clip a considerable stretch of hedge step by step from top to bottom, and then after moving the apparatus lengthwise is enabled to similarly cut an adjoining stretch of hedge, and so on throughout the length of the hedge. It will also be apparent that but little effort is required to reciprocate the carriage 51 and actuate the cutting mechanism—i. e., the sickle 83, while to bring about the gravitation of the support 50 and the parts carried thereby it is simply necessary to move the carriage 51 sufficiently far rearwardly to engage the head 59 and retract the rod 52.

To shift the clipping organization from the position shown in Figure 3 to the inclined position shown in Figure 14 or to other angles of inclination, it is simply necessary to first loosen the screw 17, adjust the support 50 laterally to the extent desired and then tighten the said screw 17.

In the modification shown in Figures 19 and 20 a horizontally-disposed cutting mechanism is carried on the lateral extension 80$^x$ of the carriage 51$^x$ for the clipping of the top of a hedge; the crank 85$^x$ in said embodiment being in the form of a miter gear meshed with a miter gear 85$^z$ on a shaft 86$^x$ rotated in the manner before described. It will also be noted that the horizontal sickle 83$^x$ is reciprocated by the crank disk 85$^x$ through the rod or pitman 87$^x$.

In Figures 21, 22 and 23, I show modified means for supporting the sleeve and the carriage-support on the column. The sleeve is designated 30$^x$, the carriage-support 50$^x$ and the column 23$^x$. As shown the column 23$^x$ is provided at opposite sides with vertical racks 100 and 101, meshed with the rack 100 is an idle gear 41$^w$ carried by and disposed above the said sleeve 30$^x$. Meshed with the rack 101 and adapted to hold the sleeve 30$^x$ against downward movement is a gear 102 fixed on a shaft 103, journaled in bearings on the sleeve 30$^x$. Also fixed on the shaft 103 is a gear 104 that is intermeshed with a gear 105 carried by the sleeve 30$^x$ and arranged alongside thereof. Fixed with respect to the gear 105 at the outer side thereof is a wheel 35$^x$ with apertures 40$^x$. At 52$^x$ is a longitudinal rod corresponding to and operated in the same manner as the before described rod 52. The said rod 52$^x$ is provided at 53$^x$ with a portion in which is a cam slot 54$^x$, and pivoted at 55$^x$ to the sleeve 30$^x$ and extending through said cam slot 54$^x$ is a detent 56$^x$ with a lateral upper end portion 57$^x$ adapted to enter the apertures 40$^x$, one by one, and thereby hold the wheel 35$^x$ against turning, and the sleeve 30$^x$ and the support 50$^x$ against gravitational movement. At 110 on the sleeve 30$^x$ is a guide arm for the rod 52$^x$ on the forward end of which is a head 111, designed to limit rearward movement of the said rod 52$^x$ when the latter is moved rearwardly by the carriage 51 in the manner before described. It being remembered that Figure 23 is a horizontal section, it will be understood that rearward movement of the rod 52$^x$ will be attended by outward movement of the detent 56$^x$ and withdrawal of the end portion 57$^x$ thereof from one aperture 40$^x$ of wheel 35$^x$ whereupon the released sleeve 30$^x$ will gravitate and the wheel 105 will be turned until the next aperture 40$^x$ is opposite the detent portion 57$^x$ when said portion will enter said aperture and hold the sleeve 30$^x$ against further gravitational action, the spring 57, Figure 1, having at that time operated to move rod 52$^x$ forwardly so as to cause the cam slot 54$^x$ by acting against the detent 56$^x$ to move said detent into the normal position illustrated. Manifestly in the manner described the construction shown in Figures 21–23 is adapted to effect the step by step downward movements of the support 52$^x$ at the will of the operator and for the purpose before indicated.

I have entered into a detailed description of the construction and relative arrangement of the parts embraced in the present and preferred embodiments of my invention in order to impart a full, clear and exact understanding of the said embodiments. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. In a hedge clipper, the combination of a longitudinal support, a carriage movable manually to and fro thereon, cutting mechanism carried by said carriage, and cooperating means on the support and carriage to actuate the cutting mechanism by movement of the carriage relative to the support; the means on the carriage including a ratchet and pawl whereby the cutting mechanism idles on movement of the carriage in one direction.

2. In a hedge clipper, the combination of a longitudinal support, a carriage movable manually to and fro thereon, cutting mechanism carried by said carriage, and cooperating means on the support and carriage to actuate the cutting mechanism by movement of the carriage relative to the support; the said means on the support being a longitudinal rack bar, and means on the carriage including a gear meshed with the rack bar and a driving connection between the gear and the cutting mechanism and embodying a ratchet and pawl whereby the cutting mechanism is caused to idle on movement of the carriage in one direction.

3. In a hedge clipper, the combination of a longitudinal support, a carriage movable manually to and fro thereon, cutting mechanism carried by said carriage, and cooperating means on the support and carriage to actuate the cutting mechanism by movement of the carriage relative to the support; the said carriage being provided with a lateral extension, and the cutting mechanism being located on said extension.

4. In a hedge clipper, the combination of a longitudinal support, a carriage movable manually to and fro thereon, cutting mechanism carried by said carriage, and cooperating means on the support and carriage to actuate the cutting mechanism by movement of the carriage relative to the support; the cutting mechanism comprising a finger bar and a reciprocatory sickle, the means on the support being a rack, and the means on the carriage including a gear meshed with said rack, a balance wheel, and a connection between the gear and the sickle and having a ratchet and pawl.

5. In a hedge clipper, the combination of a column, gravitational means associated therewith, a support carried by and extending from said means, means to detachably hold said gravitational means against downward movement, a carriage on the support and carrying cutting mechanism, means to actuate said mechanism, and means operable by the carriage to release the gravitational means, said detachably holding means constructed and arranged to catch and hold the gravitational means following downward movement thereof, and the carriage-operable means including a longitudinal rod below the carriage with an apertured end and a head thereon for the engagement of the carriage, and a spring to move said rod in one direction.

6. In a hedge clipper, the combination of a base, a column hinged thereto, a longitudinal support connected with and supported by the column, adjustable means associated with the base and the longitudinal support to maintain said support and the column in various positions, a carriage movable on the support, and cutting mechanism carried by said carriage.

7. In a hedge clipper, the combination of a base, a column hinged thereto, a longitudinal support connected with and supported by the column, adjustable means associated with the base and the longitudinal support to maintain said support and the column in various positions, a carriage movable on the support, and cutting mechanism carried by said carriage; the said adjustable means being pivoted and clamped to the base, and the support carrying a sleeve movable on a portion of said means.

8. In a hedge clipper, the combination of a base, a column hinged thereto, gravitational means associated with the column, a longitudinal support connected with said gravitational means, adjustable means associated with the base and the longitudinal support to maintain said support and the column in various positions, means on the gravitational means and engaging the column to detachably hold the column against gravitation, a carriage movable on the support, cutting mechanism carried by the carriage and operable by movement of the carriage relative to the support, and means operable by the carriage to disengage the holding means from the column.

9. In a hedge clipper, the combination of a base, a column hinged thereto, gravitational means associated with the column, a longitudinal support connected with said gravitational means, adjustable means associated with the base and the longitudinal support to maintain said support and the column in various positions, means on the gravitational means and engaging the column to detachably hold the column against gravitation, a carriage movable on the support, cutting mechanism carried by the carriage and operable by movement of the carriage relative to the support, and means operable by the carriage to disengage the holding means from the column, said means including a rod on the support and a spring to move said rod in one direction.

10. The combination of a column having an upright channel and spaced steps therein, a sleeve movable endwise on said column, a support carried by said sleeve, a spring-pressed lever carried by the sleeve and arranged to engage the column steps and hold the sleeve against downward movement, a toothed wheel on the sleeve arranged when moved to disengage said lever and permit gravitation of the sleeve, and means to turn or move said wheel.

11. The combination of a column having an upright rack, a sleeve movable endwise on said column, a support carried by said sleeve, a gear carried by the sleeve and meshed with said rack, an apertured wheel also carried by the sleeve and connected with said gear, a detent carried by the sleeve to engage the apertures of said wheel, and a rod with a cam slot receiving said detent.

In testimony whereof, I affix my signature.

EVERETTE C. CONRADE.